United States Patent
Shimotsuma

(10) Patent No.: US 11,552,965 B2
(45) Date of Patent: Jan. 10, 2023

(54) ABNORMALITY CAUSE SPECIFICATION SUPPORT SYSTEM AND ABNORMALITY CAUSE SPECIFICATION SUPPORT METHOD

(71) Applicant: HITACHI, LTD., Tokyo (JP)

(72) Inventor: Naoki Shimotsuma, Tokyo (JP)

(73) Assignee: Hitachi, Ltd, Tokyo (JP)

(*) Notice: Subject to any disclaimer, the term of this patent is extended or adjusted under 35 U.S.C. 154(b) by 276 days.

(21) Appl. No.: 16/957,236

(22) PCT Filed: Dec. 5, 2018

(86) PCT No.: PCT/JP2018/044745
§ 371 (c)(1),
(2) Date: Jun. 23, 2020

(87) PCT Pub. No.: WO2019/131023
PCT Pub. Date: Jul. 4, 2019

(65) Prior Publication Data
US 2020/0412748 A1 Dec. 31, 2020

(30) Foreign Application Priority Data
Dec. 28, 2017 (JP) .............................. JP2017-254752

(51) Int. Cl.
*H04L 29/06* (2006.01)
*H04L 9/40* (2022.01)
*G06F 16/23* (2019.01)

(52) U.S. Cl.
CPC ...... *H04L 63/1416* (2013.01); *G06F 16/2379* (2019.01); *H04L 63/1425* (2013.01); *H04L 63/20* (2013.01)

(58) Field of Classification Search
CPC . H04L 63/1416; H04L 63/1425; H04L 63/20; H04L 63/145; H04L 63/1441; G06F 16/2379
See application file for complete search history.

(56) References Cited

U.S. PATENT DOCUMENTS 6,513,122 B1 * 1/2003 Magdych ............ H04L 63/1433
713/188
6,836,888 B1 * 12/2004 Basu ...................... G06F 21/57
718/100
(Continued)

FOREIGN PATENT DOCUMENTS

CN 101316187 A * 12/2008
CN 102413003 A * 4/2012
(Continued)

OTHER PUBLICATIONS

International Search Report for related International Application No. PCT/JP2018/044745, dated Feb. 26, 2019; English translation provided (2 pages).

*Primary Examiner* — John B King
(74) *Attorney, Agent, or Firm* — Procopio, Cory, Hargreaves & Savitch LLP

(57) ABSTRACT

[Problem] An abnormality cause route in a network can be efficiently specified, and labor and a cost required for work can be reduced.
[Solution] An abnormality cause specification support system 101 includes: a storage device 203 that holds communication relation information 401 in which a communication history between terminals 20 belonging to a predetermined network 10 is stored separately according to presence and absence of a session in the communication, and a policy 601 for specifying an abnormality cause route occurring in the network 10; and an arithmetic device 201 that specifies, among the communication history indicated by the commu- (Continued)

nication relation information 401, a communication history indicating a condition defined in the policy 601 and a predetermined degree of conformity, and specifies a route between the terminals indicated by the specified communication history as an abnormal cause route to be considered with priority in the network 10.

12 Claims, 8 Drawing Sheets

(56) References Cited

U.S. PATENT DOCUMENTS

| | | | | |
|---|---|---|---|---|
| 2003/0163729 | A1* | 8/2003 | Buchegger | H04L 41/0681 |
| | | | | 726/22 |
| 2004/0049695 | A1* | 3/2004 | Choi | H04L 63/1408 |
| | | | | 726/23 |
| 2006/0259589 | A1* | 11/2006 | Lerman | G06F 16/40 |
| | | | | 709/219 |
| 2007/0115988 | A1* | 5/2007 | Miller | H04L 63/101 |
| | | | | 370/392 |
| 2008/0242280 | A1* | 10/2008 | Shapiro | H04W 8/24 |
| | | | | 455/414.3 |
| 2008/0244693 | A1* | 10/2008 | Chang | H04L 67/02 |
| | | | | 726/1 |
| 2009/0319659 | A1 | 12/2009 | Terasaki et al. | |
| 2010/0082513 | A1* | 4/2010 | Liu | G06N 3/006 |
| | | | | 706/46 |
| 2010/0100949 | A1* | 4/2010 | Sonwane | H04L 63/102 |
| | | | | 726/13 |
| 2013/0117847 | A1* | 5/2013 | Friedman | H04L 47/20 |
| | | | | 709/201 |
| 2015/0304169 | A1* | 10/2015 | Milman | H04L 41/0823 |
| | | | | 709/220 |
| 2016/0006766 | A1* | 1/2016 | Joo | G06F 21/53 |
| | | | | 726/1 |
| 2016/0197947 | A1* | 7/2016 | Im | H04L 63/1425 |
| | | | | 726/23 |
| 2016/0301704 | A1* | 10/2016 | Hassanzadeh | H04L 63/0227 |
| 2018/0013787 | A1* | 1/2018 | Jiang | H04L 43/16 |
| 2020/0162500 | A1* | 5/2020 | Ciocarlie | H04L 41/145 |

FOREIGN PATENT DOCUMENTS

| | | | | |
|---|---|---|---|---|
| CN | 104539595 | A * | 4/2015 | ........... H04L 45/123 |
| CN | 107135224 | A * | 9/2017 | ........... H04L 41/142 |
| CN | 107888588 | A * | 4/2018 | ......... H04L 63/1433 |
| JP | 2005130121 | A * | 5/2005 | |
| JP | 2008-211464 | A | 9/2008 | |
| JP | 2016-184870 | A | 10/2016 | |
| WO | WO-0159584 | A1 * | 8/2001 | ......... H04L 63/1408 |
| WO | WO-2004070509 | A2 * | 8/2004 | ......... H04L 63/0236 |
| WO | 2008/084729 | A | 7/2008 | |

* cited by examiner

[FIG. 1]
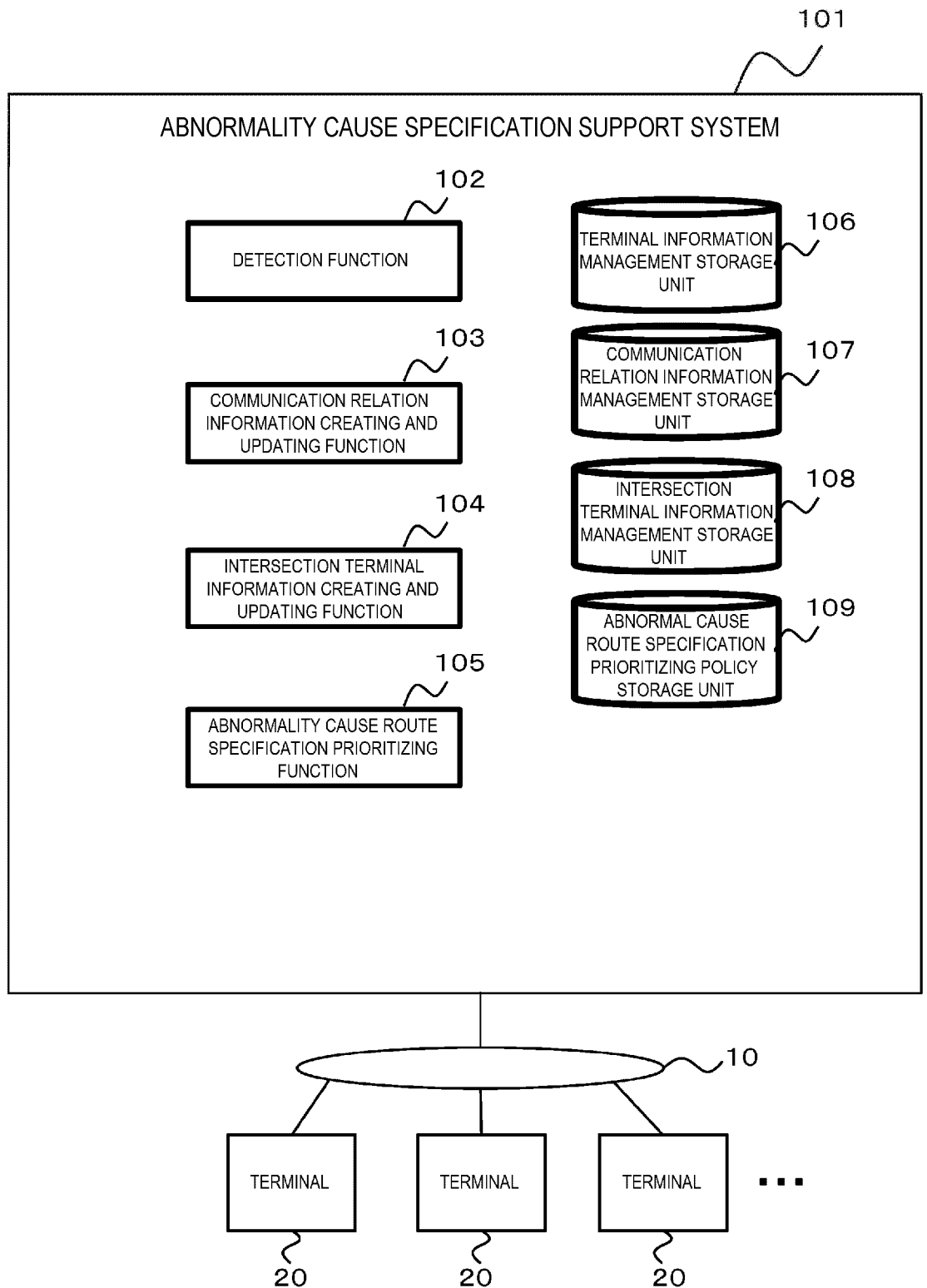

[FIG. 2]
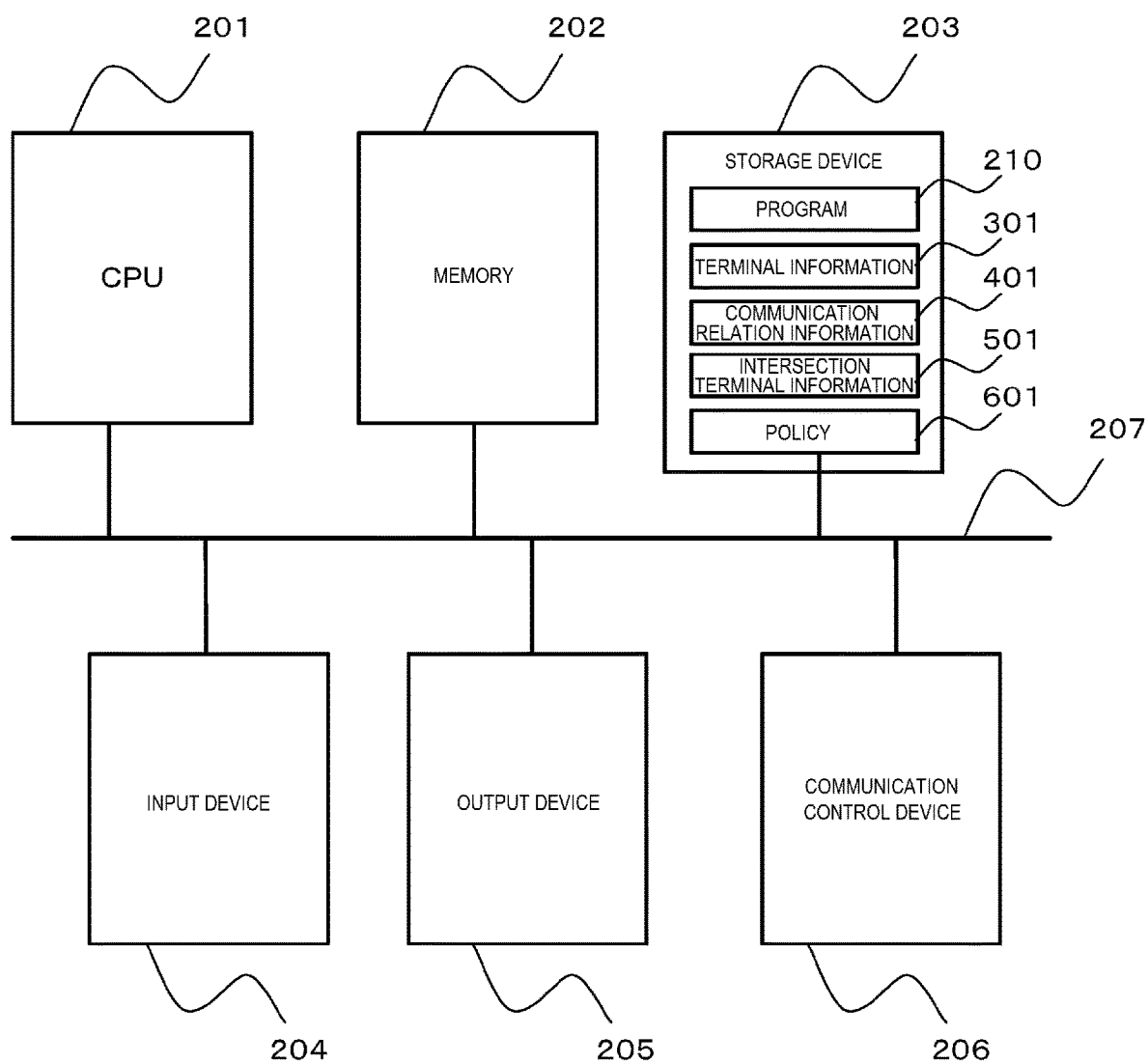

[FIG. 3]

TERMINAL INFORMATION 301

| TERMINAL ID 302 | ATTRIBUTE INFORMATION (IP ADDRESS) 303 |
|---|---|
| 0001 | 192.1.0.10 |
| 0002 | 192.1.0.20 |
| 0003 | 192.1.0.30 |
| 0004 | 192.1.0.40 |
| 0005 | 192.1.0.50 |
| ... | ... |
| 0091 | 168.1.0.10 |
| 0092 | 192.1.0.20 |
| ... | ... |
| 0201 | 172.1.0.10 |
| 0202 | 172.1.0.20 |
| 0203 | 172.1.0.30 |
| ... | ... |
| ... | ... |

[FIG. 4]

COMMUNICATION RELATION INFORMATION

| TERMINAL ID | SOURCE TERMINAL ID OF COMMUNICATION WITH SESSION | | | | SOURCE TERMINAL ID OF COMMUNICATION WITHOUT SESSION | | | |
|---|---|---|---|---|---|---|---|---|
| 0001 | 0002 | | | | 0003 | 0005 | | |
| 0002 | 0003 | 0001 | | | — | | | |
| 0003 | — | | | | 0001 | | | |
| 0004 | 0001 | 0002 | | | — | | | |
| 0005 | 0003 | 0001 | 0004 | | 0006 | | | |
| ... | ... | | | | ... | | | |
| 0091 | 00092 | | | | — | | | |
| 0092 | 00091 | 00095 | ... | | ... | | | |
| ... | ... | | | | ... | | | |
| 0201 | 0203 | | | | — | | | |
| 0202 | — | | | | 0201 | | | |
| 0203 | 0201 | | | | — | | | |
| ... | ... | | | | ... | | | |
| ... | ... | | | | ... | | | |
| ... | ... | | | | ... | | | |

[FIG. 5]

INTERSECTION TERMINAL INFORMATION

| TERMINAL ID \ TERMINAL ID | 0002 | 0004 | 0005 | ... | 0092 | ... |
|---|---|---|---|---|---|---|
| 0002 | | 2 | 3 | ... | ∞ | ... |
| 0004 | 2 | | 1 | ... | ∞ | ... |
| 0005 | 3 | 1 | | ... | ∞ | ... |
| ... | ... | ... | ... | | | ... |
| 0092 | ∞ | ∞ | ∞ | ... | | ... |
| ... | ... | ... | ... | ... | ... | |

[FIG. 6]

ABNORMAL CAUSE ROUTE SPECIFICATION PRIORITIZING POLICY

| PRIORITY ORDER FOR PRIORITIZING ROUTE SPECIFICATION | SOURCE TERMINAL OF COMMUNICATION WITH SESSION OF TERMINAL |
|---|---|
| END CONDITION FOR PRIORITIZING ROUTE SPECIFICATION | • CHECK ALL TERMINALS AS TRANSMISSION SOURCES OF COMMUNICATION WITH SESSION OF INFECTED TERMINAL<br>• ALSO CHECK INTERSECTION TERMINAL CLOSEST TO INFECTED TERMINAL |

[FIG. 7]
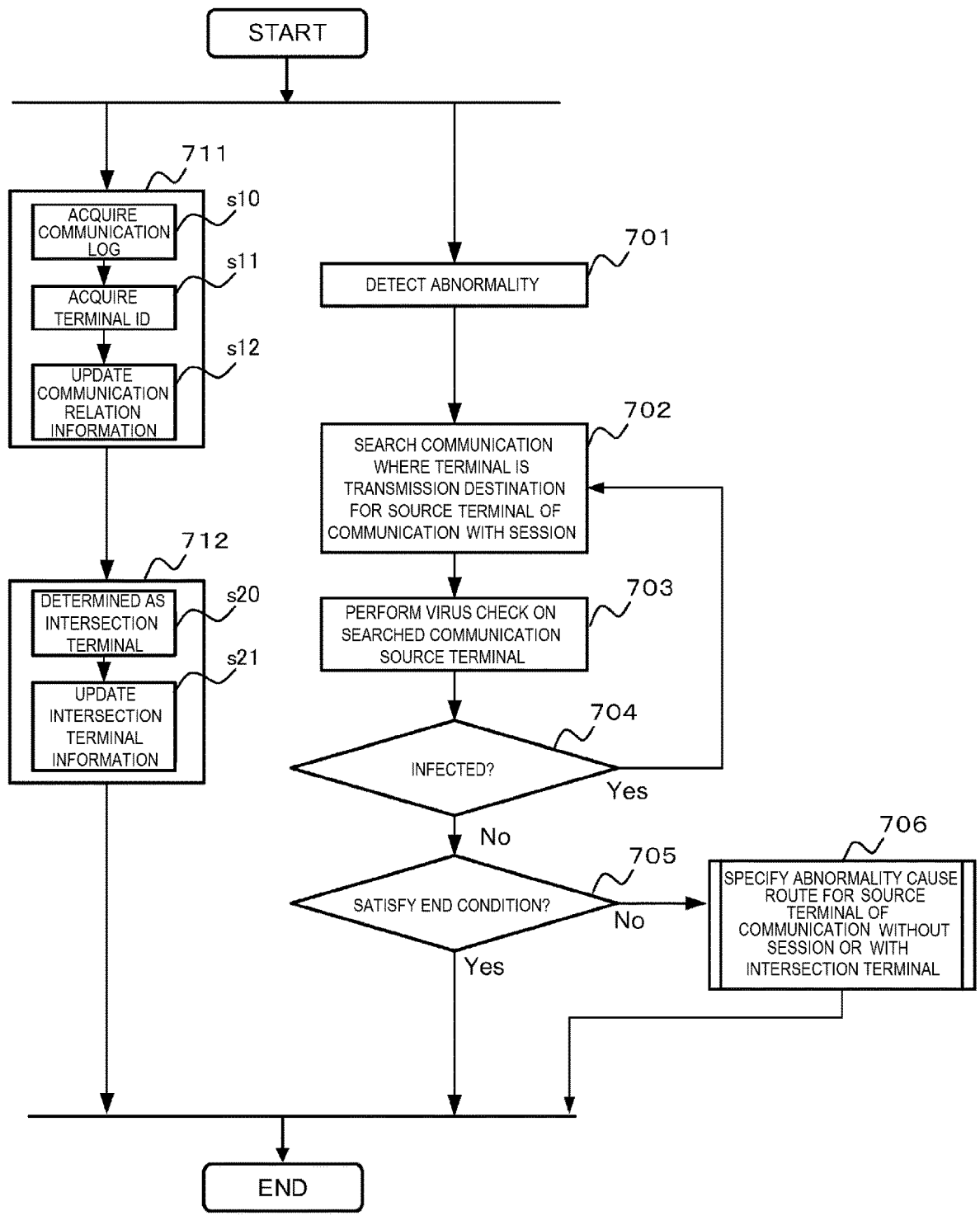

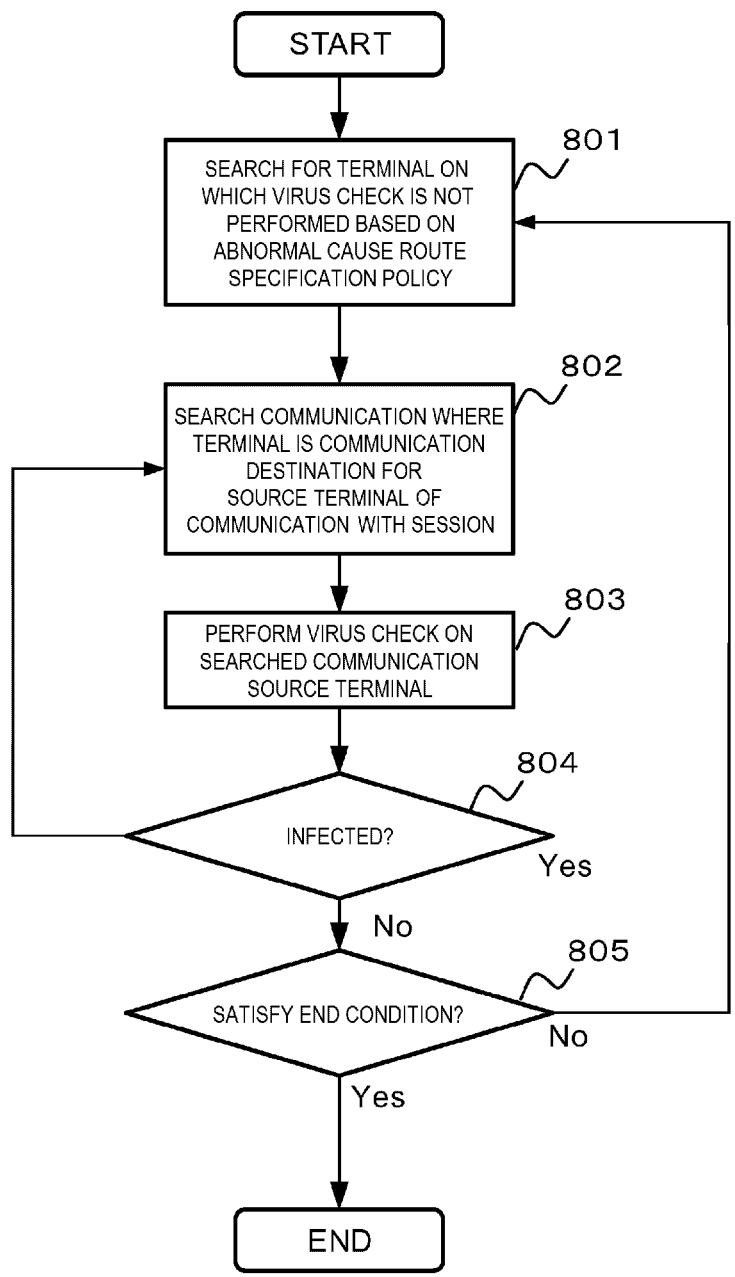
[FIG. 8]

[FIG. 9]
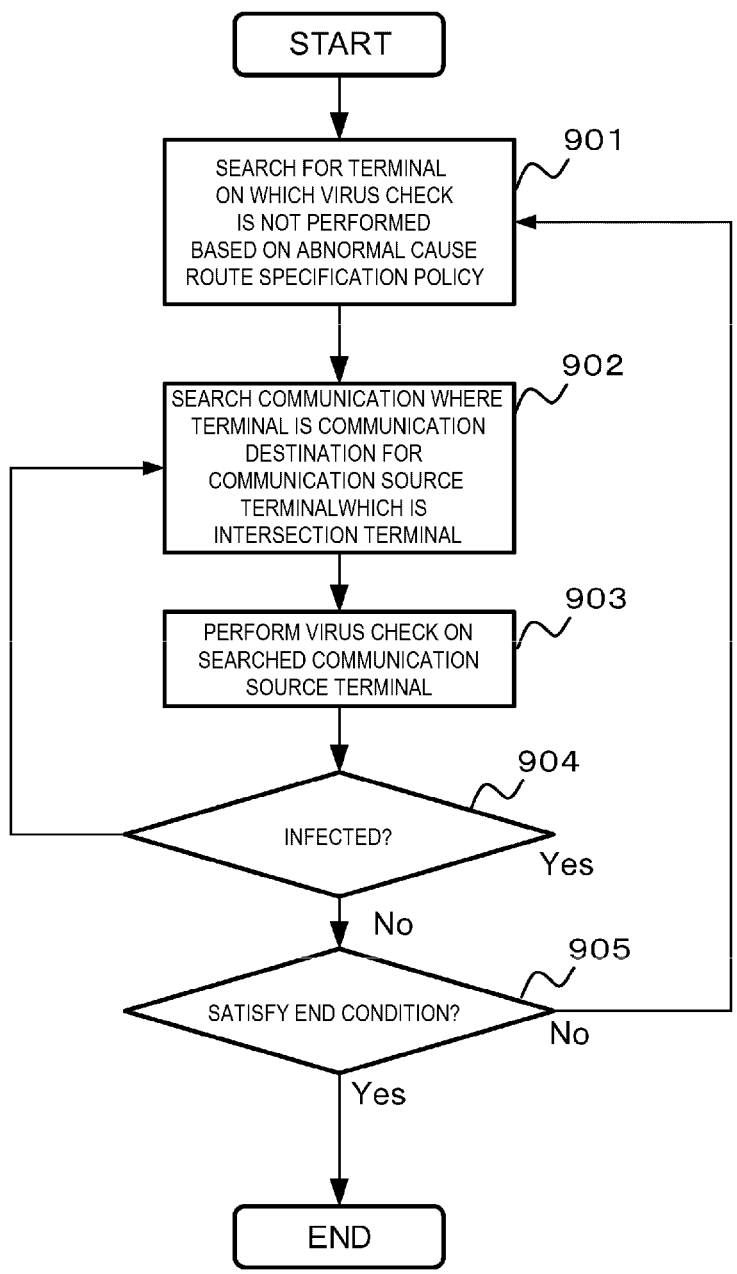

ABNORMALITY CAUSE SPECIFICATION SUPPORT SYSTEM AND ABNORMALITY CAUSE SPECIFICATION SUPPORT METHOD

CROSS-REFERENCE TO RELATED APPLICATIONS

This application is a U.S. National Stage entry of PCT Application No: PCT/JP2018/044745 filed Dec. 5, 2018, which claims priority to Japanese Patent Application No. 2017-254752, filed Dec. 28, 2017, the contents of which are incorporated herein by reference.

TECHNICAL FIELD

The present invention relates to an abnormality cause specification support system and an abnormality cause specification support method, in particular to a technique capable of efficiently specifying an abnormality cause route in a network and reducing labor and a cost required for the work. This research (a part of), where the invention was created, is implemented by a strategic innovation creation program (SIP) "ensuring cyber security in critical infrastructure, etc." (Management Corporation: NEDO) of Council for Science, Technology and Innovation.

BACKGROUND ART

When a communication abnormality is confirmed in a network of a company or the like, a predetermined person in charge carries out an operation of specifying a route that causes the abnormality.

Meanwhile, in recent years, a type of malware that spreads by being lost in ordinary business communication has been increasing. For this reason, the above-described person in charge needs to specify the route that causes the abnormality only from the communication, and to deal with this problem.

Therefore, as a related art for specifying a communication route (hereinafter, referred to as an abnormality cause route) that causes such an abnormality, for example, a network abnormality detection system (see PTL 1) or the like is proposed. The network abnormality detection system that detects an abnormality of the network due to an attack packet flowing into the network from one or more external networks includes: one or more relay units provided between the network and each of the external networks and configured to relay a communication packet transmitted to/received from each external network; one or more packet information holding units configured to capture all communication packets passing through the corresponding relay unit and hold packet information of each communication packet passing through each relay unit as a passage history; an attack detection unit configured to detect flow in of the attack packet; a packet passage inquiry unit configured to inquire about whether or not the attack packet has passed through each relay unit when an attack by the attack packet is detected by the attack detection unit; a packet passage detecting unit configured to refer to the communication history of each relay unit of the packet information holding unit, and detect passage of the attack packet in each relay unit when the inquiry is received from the packet passing inquiry unit; and an invasion entrance specifying unit configured to specifies the relay unit which has become an invasion entrance of the attack packet on the basis of the detection result from the packet passage detecting unit about whether or not the attack packet has passed in each relay unit.

CITATION LIST

Patent Literature

PTL 1: JP-A-2008-211464

SUMMARY

Technical Problem

In the related art, it is said that communication logs of all relay terminals on a communication route is searched, and the abnormal cause route is specified by using the communication logs. When such a method is adopted, a predetermined process required for specifying the abnormal cause route is performed on a huge number of communication logs. Therefore, the work requires a considerable amount of labor and time and, and there is a risk that efficiency of the work will be reduced and a cost will be increased.

An object of the invention is to provide a technique capable of efficiently specifying an abnormality cause route in a network and reducing labor and a cost required for the work.

Solution to Problem

An abnormality cause specification support system of the invention for solving the above problem includes: a storage device configured to hold communication relation information in which a communication history between terminals belonging to a predetermined network is stored separately according to presence and absence of a session in the communication, and a policy for specifying a cause route of an abnormality occurring in the network; and an arithmetic device configured to specify, among the communication history indicated by the communication relation information, one indicating a predetermined degree of conformity with a condition defined in the policy, and specify a route between the terminals indicated by the specified communication history as an abnormal cause route to be considered with priority in the network.

In addition, an abnormality cause specification support method of the invention includes: an information processing system which includes a storage device configured to hold communication relation information in which a communication history between terminals belonging to a predetermined network is stored separately according to presence and absence of a session in the communication, and a policy for specifying an abnormality cause route occurring in the network specifying, among the communication history indicated by the communication relation information, one indicating a condition defined in the policy and a predetermined degree of conformity; and specifying a route between the terminals indicated by the specified communication history as an abnormal cause route to be considered with priority in the network.

Advantageous Effects of Invention

According to the invention, the abnormality cause route in the network can be efficiently specified, and the labor and the cost required for the work can be reduced.

BRIEF DESCRIPTION OF DRAWINGS

FIG. 1 is a diagram showing a configuration example of a network including an abnormality cause specification support system according to a present embodiment.

FIG. 2 is a diagram showing a configuration example of hardware of the abnormality cause specification support system according to the present embodiment.

FIG. 3 is a diagram showing a configuration example of data of terminal information according to the present embodiment.

FIG. 4 is a diagram showing a configuration example of data of communication relation information according to the present embodiment.

FIG. 5 is a diagram showing a configuration example of data of intersection terminal information according to the present embodiment.

FIG. 6 is a diagram showing a configuration example of data of an abnormal cause route specification prioritizing policy according to the present embodiment.

FIG. 7 is a diagram showing a flow example 1 of an abnormality cause specification support method according to the present embodiment.

FIG. 8 is a diagram showing a flow example 2 of the abnormality cause specification support method according to the present embodiment.

FIG. 9 is a diagram showing a flow example 3 of the abnormality cause specification support method according to the present embodiment.

DESCRIPTION OF EMBODIMENTS

Network Configuration

Hereinafter, an embodiment of the invention will be described in detail with reference to the accompanying drawings. FIG. 1 is a diagram showing a configuration example of a network including an abnormality cause specification support system 101 according to the present embodiment. The abnormality cause specification support system 101 shown in FIG. 1 is a computer system that can efficiently specify an abnormality cause route in a network of a predetermined organization such as a company, and can reduce labor and a cost required for the work.

As shown in FIG. 1, the abnormality cause specification support system 101 of the present embodiment is communicably connected to each terminal 20 connected to a network 10 via the network 10. The above-described network 10 can be, for example, assumed as an in-company network. In addition, the terminal 20 can be assumed as various information processing devices such as a server or a PC used in the company.

In the network 10, when anyone of the terminals 20 is infected with malware, the terminals 20 connected to the network 10 which are starting points are terminals that can be targets to be infected with the malware. Therefore, it is necessary for the above-described company to perform predetermined measures such as estimating an infection route of the malware from the terminal 20 that becomes an infection source and quickly stopping spread of the malware. Therefore, the abnormality cause specification support system 101 of the present embodiment supports specification of the infection route, that is, the abnormality cause route.

Of course, the configuration of the network shown in FIG. 1 is an example. When the abnormality cause specification support system 101 previously holds various types of information (including information related to malware infection) related to the network 10 and the terminals 20 under the network 10, the abnormality cause specification support system 101 may be a stand-alone machine.

The abnormality cause specification support system. 101 in the present embodiment is assumed as, for example, a server device. In addition, the abnormality cause specification support system 101 includes, as components of the system, a detection function 102, a communication relation information creating and updating function 103, an intersection terminal information creating and updating function 104, an abnormality cause route specification prioritizing function 105, a terminal information management storage unit 106, a communication relation information management storage unit 107, an intersection terminal information management storage unit 108, and an abnormal cause route specification prioritizing policy storage unit 109.

The communication relation information creating and updating function 103 of the abnormality cause specification support system 101 having such a configuration obtains a communication log between the terminals 20 that is generated in daily business processing in the above-described company, and stores the log in the communication relation information management storage unit 107 as information related to communication relation between the terminals 20, that is, communication relation information 401 (described later in FIG. 4).

At this time, the communication relation information creating and updating function 103 specifies a communication source and a communication destination of each of the terminals 20 from IP addresses included in the communication log based on terminal information 301 (described later in FIG. 3) held by the terminal information management storage unit 106, and sets information thereof as a terminal ID of the communication relation information 401.

In addition, the intersection terminal information creating and updating function 104 of the abnormality cause specification support system 101 refers to the communication relation information 401 in the above-described communication relation information management storage unit 107, specifies a terminal that is a communication source terminal with a session from a plurality of terminals as an intersection terminal, and stores information on the intersection terminal in intersection terminal information 501 of the intersection terminal information management storage unit 108 (described later in FIG. 5).

For the abnormality cause route specification prioritizing function 105 of the abnormality cause specification support system 101, when the detection function 102 detects abnormal communication caused by the malware infection at a certain terminal 20 in the above-described network 10, the terminal 20, that is, the terminal that has communicated with an infected terminal and is determined as the communication source terminal in the communication relation information 401, and a terminal defined as the intersection terminal in the intersection terminal information 501 are extracted based on abnormal cause route specification prioritizing policy information 601 (described later in FIG. 6), and the terminal is to be considered with priority when the infection route of the malware is specified, that is, when the abnormality cause route is specified.

The above-described detection function 102 is for detecting the malware infection, and an existing malware infection check tool may be appropriately employed.

Hardware Configuration

Further, the hardware configuration of the abnormality cause specification support system 101 of the present embodiment is as follows. FIG. 2 is a diagram showing a configuration example of hardware of the abnormality cause specification support system 101 according to the present embodiment.

The abnormality cause specification support system 101 includes a CPU 201, a memory 202, a storage device 203, an input device 204, an output device 205, a communication control device 206, and a bus 207 interconnecting them.

The CPU 201 is an arithmetic device that develops a program 210 stored in the storage device 203 into the memory 202 and executes the program. This program 210 is for implementing functions necessary for the abnormality cause specification support system 101.

The input device 204 is an input device such as a keyboard and a mouse.

The output device 205 is an output device such as a display or a speaker.

The communication control device 206 is, for example, a wireless network interface or a network interface card that conforms to a communication protocol of the network 10.

In addition to the above-described program 210, at least the terminal information 301 (not shown), the communication relation information 401, the intersection terminal information 501, and the abnormal cause route specification prioritizing policy 601 are stored in the storage device 203. It is assumed that the terminal information 301 and the abnormal cause route specification prioritizing policy 601 are held as input information in advance. Details of these pieces of information 301 to 601 will be described later.

Configuration Example of Data

Next, various types of information used by the abnormality cause specification support system 101 of the present embodiment will be described. FIG. 3 shows a configuration example of the terminal information 301 in the present embodiment.

The terminal information 301 is information stored in the terminal information management storage unit 106 and related to all the terminals 20 to be processed by the abnormality cause specification support system 101. A structure of data of the terminal information is a collection of records in which a terminal ID 302 that uniquely specifies the terminal 20 as a key and the IP addresses as attribute information 303 of the respective terminals are associated.

For example, attribute information (IP address) 303 related to the terminal 20 whose terminal ID 302 is "0001" is "192.1.0.10.".

FIG. 4 is a diagram showing a configuration example of data of the communication relation information 401 according to the present embodiment. The communication relation information 401 is information stored in the communication relation information management storage unit 107 and defines, for each of the above-described terminals 20, a relationship between the terminal and other terminals with which the terminal communicates in the daily business.

Specifically, the communication relation information 401 is a collection of records in which a terminal ID 402 that uniquely specifies a terminal, a communication source terminal ID 403, that is, an ID of a communication source terminal that communicates with the terminal with the session, and a communication source terminal IDB404, that is, an ID of a communication source terminal that communicates with the terminal without the session are associated.

Among these, the communication source terminal ID 403 with the session holds a terminal ID of the communication source terminal which is in communicates with the terminal and establishes a session. Further, the communication source terminal ID 404 without the session holds a terminal ID of the communication source terminal which communicates with the terminal and does not establish a session.

For example, for a terminal having the terminal ID 402 of "0002", it can be seen that a communication source terminal that communicates with the terminal with the session has two terminal IDs "0003", "0001" from the communication source terminal ID 403 with the session. In addition, it can be seen from the communication source terminal ID 404 without the session that the communication source terminal that communicates with the terminal without the session does not exist.

FIG. 5 is a diagram showing a configuration example of data of the intersection terminal information 501 according to the present embodiment. The intersection terminal information 501 is stored in the intersection terminal information management storage unit 108, and defines, with respect to the communication destination terminal (intersection terminal) with the session from the plurality of terminals among the above-described terminals 20, a distance between the intersection terminals.

Specifically, the intersection terminal information is a collection of records in which a terminal ID 502 which is a terminal ID of the intersection terminal, and distance information 503 between the intersection terminals are associated. For example, it can be seen that a distance between an intersection terminal whose terminal ID 502 is "0002" and an intersection terminal whose terminal ID 502 is "0005" is "3".

FIG. 6 is a diagram showing a configuration example of data of the abnormal cause route specification prioritizing policy 601 according to the present embodiment. The abnormal cause route specification prioritizing policy 601 is information held in the abnormal cause route specification prioritizing policy storage unit 109 and defining an attribute of a terminal that should be processed with priority for specifying the abnormality cause route when a terminal 20 infected with the malware is detected. In other words, when the terminal 20 infected with the malware is detected in the network 10, the policy is information that specifies how to specify the terminal 20 which has a possibility of the infection route and determines whether or not to follow the abnormality cause route.

Specifically, the information includes a priority order 602 for prioritizing route specification and an end condition 603 for prioritizing the route specification.

For example, it can be seen that when a process of specifying the abnormality cause route is performed in response to detection of the malware infection with respect to the terminal whose terminal ID 402 is "0001", according to "a communication source terminal with the session of the terminal" in the priority order 602 for prioritizing the route specification, the communication source terminal in the communication with the session with the terminal "0001" as the communication destination is specified as a terminal whose terminal ID is "0002" in the communication relation information 401, and the process of specifying the abnormality cause route should be performed from the "0002" terminal. In addition, it can be seen that the end condition 603 for prioritizing the abnormality route specification is to complete "checking all the terminals of transmission sources in communication and with the session of the infected terminal" and complete "checking the intersection terminal closest to the infected terminal".

Based on the above information 301 to 601, the abnormality cause specification support system 101 of the present embodiment specifies a route including a terminal with a high priority as a target of the abnormality cause route which is a starting point of an infected terminal of the malware in a target company, and information thereof can be presented to a user such as a security administrator of the system 10.

Flow Example 1

An actual procedure of an abnormality cause specification support method in the present embodiment will be described below with reference to the drawings. Various operations corresponding to the abnormality cause specification support method to be described below are implemented by the program 210 which is read out to a memory or the like and executed by the abnormality cause specification support system 101. Further, the program 210 includes codes for performing the various operations described below.

FIG. 7 is a diagram showing the flow example 1 of the abnormality cause specification support method according to the present embodiment, more specifically, is an entire processing flow of the abnormality cause specification support method. In the abnormality cause specification support system 101 of the present embodiment, a communication relation information creating and updating process performed by the communication relation information creating and updating function 103, an intersection terminal information creating and updating process performed by the intersection terminal information creating and updating function 104, and an abnormality cause route specification prioritizing process performed by the abnormality cause route specification prioritizing function 105 are independently operated.

Among them, in the communication relation information creating and updating process and the intersection terminal information creating and updating process, the communication log (communication history) generated in the target network 10 is acquired, and the communication relation information 401 of the communication relation information management storage unit 107 and the intersection terminal information 501 of the terminal information management storage unit 108 are respectively created and updated.

In addition, in the abnormality cause route specification prioritizing process, when the terminal infected with the malware is detected by the detection function 102 in the network 10 of the company, information on the infected terminal is acquired, and based on the terminal information 301 of the terminal information management storage unit 106, the communication relation information 401 of the communication relation information management storage unit 107, the intersection terminal information 501 of the terminal information management storage unit 108, and the abnormal cause route specification prioritizing policy 601 of the abnormal cause route specification prioritizing policy storage unit 109, a terminal that is to be a priority target for specifying a route of the malware infection in the network 10 is specified. Hereinafter, content of each of the above-described processes will be described.

Firstly, in the flow of the FIG. 7, a communication relation information creating and updating process 711 performed by the communication relation information creating and updating function 103, and an intersection terminal information creating and updating process 712 performed by the intersection terminal information creating and updating function 104 will be described. Subsequently, abnormal cause route specification prioritizing processes 701 to 706 performed by the detection function 102 and the abnormality cause route specification prioritizing function 105 will be described.

Firstly, the communication relation information creating and updating function 103 acquires, in the communication relation information creating and updating process 711, a communication log generated daily between the terminals 20 in the network 10 in the business at the above-described company (s10). Acquisition of this communication log is performed by appropriately using an existing network technique.

The communication relation information creating and updating function 103 refers to the communication log acquired in s10, reads respective IP addresses of a communication source terminal and a communication destination terminal, and compares the IP addresses with the terminal information 301 to acquire the terminal ID corresponding to the IP address for each of the communication source terminal and the communication destination terminal (s11).

Further, the communication relation information creating and updating function 103 refers to the record set as the terminal ID 402 in the communication relation information 401, and a value of the terminal ID of the communication destination terminal acquired in s11, the terminal ID of the communication source terminal acquired in s11 is added (s12) if each column of the communication source terminal ID 403 with the session and the communication source terminal ID 404 without the session does not include the terminal ID of the communication source terminal acquired in s11, and the Step 711 ends. If the terminal ID of the communication source terminal acquired in s11 is already included in each column of the communication source terminal ID 403 with the session and the communication source terminal ID 404 without the session, the Step 711 ends.

Next, the intersection terminal information creating and updating function 104 adds the terminal ID of the communication source terminal to the column of the communication source terminal ID 403 with the session in a certain record of the communication relation information 401 in the above-described Step 711. Accordingly, when the number of the terminal IDs in the column becomes two or more, a terminal corresponding to the terminal ID 402 in the record, that is, the communication destination terminal is determined as the intersection terminal (s20).

Further, the intersection terminal information creating and updating function 104 generates a record in the intersection terminal information 501 for the terminal determined as the intersection terminal in s20, adds the terminal ID 402 of the terminal as the intersection terminal ID 502, and calculates a distance to another intersection terminal already defined in the intersection terminal information 501, then adds a value thereof (s21), and Step 712 ends.

above-described calculation of the distance is to, for example, calculate the number of nodes that can be connected via the network based on network configuration information held in advance by the abnormality cause specification support system 101. The above-described network configuration information is, for example, information that defines a connection relationship between the nodes such as the terminals 20 and routers belonging to the network 10.

Subsequently, a processing outline of Steps 701 to 706 will be described below. In this case, firstly, the detection function 102 detects the terminal 20 that is infected with the malware, that is, the infected terminal, in the above-described network 10, and notifies the abnormality cause route specification prioritizing function 105 of the terminal ID of the infected terminal (Step 701).

The abnormality cause route specification prioritizing function 105 searches the records of the communication relation information 401 for a record including the terminal ID as the terminal ID 402 based on the terminal ID acquired in the above-described Step 701 described above, and acquires a value of the communication source terminal ID information 403 with the session of the record (Step 702). The value of the communication source terminal ID information 403 with the session acquired here is the ID of the terminal 20 that is the priority target for specifying the abnormality cause route.

Next, the abnormality cause route specification prioritizing function 105 performs a virus check on each terminal corresponding to the communication source terminal ID 403 acquired in the above-described Step 702 (Step 703). It should be noted that the abnormality cause route specification prioritizing function 105 holds a virus check program in advance, and can execute the virus check program as needed to perform a virus check process. In addition, the abnormality cause route specification prioritizing function 105 holds an unfinished status of the virus check for each terminal in, for example, the memory 202.

When a result of the above-described virus check is that infection is confirmed (Step 704: Yes), the abnormality cause route specification prioritizing function 105 searches the records of the communication relation information 401, that is, records in which the terminal is as the communication destination, for a record including the terminal ID of the terminal as the terminal ID 402 as a target to be processed in Step 702 for the corresponding terminal, and acquires the value of the communication source terminal ID information 403 with the session of the record. Similarly, the abnormality cause route specification prioritizing function 105 executes Step 703.

That is, the abnormality cause route specification prioritizing function 105 performs the virus check (Step 703) on all the terminals searched in the above-described Step 702, and when no infection is confirmed (Step 704: No), the process transits to Step 705.

Subsequently, the abnormality cause route specification prioritizing function 105 determines whether or not the end condition of the abnormality cause route specification prioritizing process is satisfied based on the end condition 603 for prioritizing the route specification of the abnormal cause route specification prioritizing policy 601 (Step 705).

When the end condition is already shown in FIG. 6, "checking all the terminals of the transmission sources in communication and with session of the infected terminal" and "checking the intersection terminal closest to the infected terminal" are also performed. At the time of up to Step 705 shown in the above-described embodiment, the "checking all the terminals of the transmission sources in communication and with session of the infected terminal" is completed, but the "checking the intersection terminal closest to the infected terminal" is not performed. Therefore, a determination result representing that the end condition is not satisfied is obtained.

When the above-described determination result is that the above-described end condition is satisfied (Step 705: Yes), the abnormality cause route specification prioritizing function 105 ends the process.

On the other hand, when the above-described determination result is that the above-described end condition is not satisfied (Step 705: No), the abnormality cause route specification prioritizing function 105 executes Step 706, and ends this flow after Step 706 ends.

The above is an outline of the communication relation information creating and updating process, the intersection terminal information creating and updating process, and the abnormality cause route specification prioritizing process in the abnormality cause specification support system 101 of the present embodiment. Subsequently, details of the above-described Step 706 will be described below.

Flow Example 2

Next, details of Step 706 in the above-described flow example 1 will be described. FIG. 8 is a diagram showing a flow example 2 of the abnormality cause specification support method according to the present embodiment.

In this case, based on the end condition 603 for prioritizing abnormality cause route specification in the abnormal cause route specification prioritizing policy 601, the abnormality cause route specification prioritizing function 105 specifies a terminal whose attribute is to be checked for the end condition based on at least one of the communication relation information 401 and the intersection terminal information 501, and searches the specified terminals here for a terminal on which the virus check is not performed in the memory 202 (Step 801). As described above, for example, it is assumed that the memory 202 stores information on the unfinished status of the virus check for each terminal.

Further, the abnormality cause route specification prioritizing function 105 searches the communication relation information 401 for a record of communication with the terminal being the transmission destination for each of the terminals that is not subjected to the virus check and has been searched in the above-described Step 801 described above, and searches a value of the communication source terminal ID 404 without the session in the record (Step 802). The value of the communication source terminal ID 404 without the session searched here is the ID of the terminal 20 that is the priority target for specifying the abnormality cause route.

Next, the abnormality cause route specification prioritizing function 105 performs the virus check on each terminal searched in the above-described Step 802 (Step 803).

When a result of the above-described virus check is that the infection is confirmed (Step 804: Yes), the abnormality cause route specification prioritizing function 105 performs the process of Step 802 on the infected terminal in a similar manner as described above to newly search for a terminal, performs the virus check in Step 803 on all the terminals searched here, and when no infection is confirmed (Step 804: No), the process proceeds to next Step 805.

Subsequently, the abnormality cause route specification prioritizing function 105 determines whether or not the end condition of the abnormality cause route specification prioritizing process is satisfied based on the end condition 603 for prioritizing the route specification of the abnormal cause route specification prioritizing policy 601 (Step 805). This determination process is the similar to Step 705 in flow example 1.

When the above-described determination result is that the end condition is not satisfied (Step 805: No), the abnormality cause route specification prioritizing function 105 returns the process to Step 801.

On the other hand, when the above-described determination result is that the end condition is satisfied (Step 805: Yes), the abnormality cause route specification prioritizing function 105 ends the present flow.

The above is an entire process of specifying the priority target for specifying the abnormality cause route when an abnormal communication due to the malware infection is detected in the terminal in the network 10 of a predetermined company. As a result, it is possible to reduce the labor, time, and the cost for estimating which terminal in the network 10 is the infection route of the malware based on the infected terminal.

Flow Example 3

Next, another detailed flow of Step 706 in the above-described flow example 1 will be described. FIG. 9 is a diagram showing the flow example 3 of the abnormality cause specification support method according to the present embodiment.

In this case, based on the end condition 603 for prioritizing abnormality cause route specification in the abnormal cause route specification prioritizing policy 601, the abnormality cause route specification prioritizing function 105 specifies a terminal whose attribute is to be checked for the end condition based on the communication relation information 401, and searches the specified terminals here for a terminal that is not subjected to the virus check in the memory 202 (Step 901). As described above, for example, it is assumed that the memory 202 stores information on the unfinished status of the virus check for each terminal.

Further, the abnormality cause route specification prioritizing function 105 searches the communication relation information 401 for the record of the communication with the terminal being the communication destination for each of the terminals that is not subjected to the virus check and has been searched in the above-described Step 901 described above, searches respective values of the communication source terminal ID 403 with the session and the communication source terminal ID 404 without the session in the record, and then searches the intersection terminal information 501 by the value of the terminal ID obtained by this search (Step 902). The value of the terminal ID of the intersection terminal that can be searched here is the ID of the terminal 20 that is the priority target for specifying the abnormality cause route.

Further, during the search in the above-described Step 902, when the respective values of the communication source terminal ID 403 with the session and the communication source terminal ID 404 without the session are the intersection terminals, based on information on the distance to another intersection terminal defined by the record of the intersection terminal in the intersection terminal information 501, it is preferable that the abnormality cause route specification prioritizing function 105 specifies other intersection terminals whose distance from the intersection terminal is within a predetermined range. There is no particular limitation on the range of the distance, but other intersection terminals with "∞" indicating that the network belongs to another segment being set are excluded from the target.

Next, the abnormality cause route specification prioritizing function 105 performs the virus check on each intersection terminal searched in the above-described Step 902 (Step 903).

When a result of the above-described virus check is that the infection is confirmed (Step 904: Yes), the abnormality cause route specification prioritizing function 105 performs the process of Step 902 for the infected terminal in a similar manner as described above to newly search for a terminal, performs the virus check in Step 903 on all the terminals searched here, and when no infection is confirmed (Step 904: No), the process proceeds to next Step 905.

Subsequently, the abnormality cause route specification prioritizing function 105 determines whether or not the end condition of the abnormality cause route specification prioritizing process is satisfied based on the end condition 603 for prioritizing the route specification of the abnormal cause route specification prioritizing policy 601 (Step 905). This determination process is similar to Step 705 in flow example 1.

When the above-described determination result is that the end condition is not satisfied (Step 905: No), the abnormality cause route specification prioritizing function 105 returns the process to Step 901.

On the other hand, when the above-described determination result is that the end condition is satisfied (Step 905: Yes), the abnormality cause route specification prioritizing function 105 ends the present flow.

Hereinafter, although a best mode for carrying out the invention, and the like have been specifically described, the invention is not limited thereto and may be modified in various ways without departing from a gist thereof.

According to the present embodiment, the terminal that is to be the priority target in the process of specifying the abnormality cause route in the network can be efficiently specified. For this reason, the user such as the security administrator can execute a measure for specifying the abnormality cause route from the terminal having the higher priority. That is, the abnormality cause route in the network can be efficiently specified, and the labor and the cost required for the work can be reduced.

According to the description of this specification, at least the following is clarified. That is, in the abnormality cause specification support system of the present embodiment, the storage device may further hold information on an intersection terminal that is a communication partner with a session from a plurality of terminals, the arithmetic device may specify that a communication source terminal among the terminals that perform communication is the intersection terminal as one indicating the condition defined in the policy and a predetermined degree of conformity among the communication histories indicated by the communication relation information.

Accordingly, a terminal that communicates with a terminal presumed to be infected with the malware or the like serves as a starting point for many communications, and an intersection terminal that can widely spread effects of the malware infection or the like can be presented to the user as one of abnormality causes. As a result, the abnormality cause route in the network can be efficiently specified, and the labor and the cost required for the work can be further reduced.

Further, in the abnormality cause specification support system of the present embodiment, the storage device may further hold the distance information between the intersection terminals, and the arithmetic device may specify that the communication source terminal among the terminals that perform communication is the intersection terminal, specify another intersection terminal within the predetermined distance range from the specified intersection terminal based on the distance information, and further specify a route between the specified intersection terminal and the other intersection terminal as the abnormality cause route as one indicating the condition defined in the policy and the predetermined degree of conformity among the communication histories indicated by the communication relation information.

Accordingly, a route serving as the starting point for many communications and a route between the intersection terminals that can widely spread effects of the malware infection or the like can be presented to the user as one of abnormality causes. As a result, the abnormality cause route in the network can be efficiently specified, and the labor and the cost required for the work can be further reduced.

Further, in the abnormality cause specification support system of the present embodiment, the arithmetic device may be a device specifying that the communication is communication without the session as one indicating the condition defined in the policy and the predetermined degree of conformity among the communication histories indicated by the communication relation information.

Accordingly, a terminal presumed to be infected with the malware or the like, and a terminal, such as broadcast and multicast, that can widely spread effects of the malware infection or the like can be presented to the user as one of abnormality causes. As a result, the abnormality cause route in the network can be efficiently specified, and the labor and the cost required for the work can be further reduced.

Further, in the abnormality cause specification support system of the present embodiment, the arithmetic device may specify that communication between the terminals is communication with the session as one indicating the condition defined in the policy and the predetermined degree of conformity among the communication histories indicated by the communication relation information.

Accordingly, the terminal presumed to be infected with the malware or the like, and the terminal that establishes a session and communicates can be presented to the user as one of abnormality causes. As a result, the abnormality cause route in the network can be efficiently specified, and the labor and the cost required for the work can be further reduced.

Further, in the abnormality cause specification support system of the present embodiment, the storage device may further hold information on acquisition time of the communication history, and the arithmetic device may further execute a process of deleting, from the communication history indicated by the communication relation information, a communication history that passes predetermined time from the acquisition time based on the information on the acquisition time.

Accordingly, by maintaining the communication relation information in the latest state, accuracy of specifying the abnormality cause route that can change in accordance with a change in an infection range or the like can be improved. As a result, the abnormality cause route in the network can be efficiently specified, and the labor and the cost required for the work can be further reduced.

That is, in the abnormality cause specification support method of the present embodiment, the information processing system may further hold information on the intersection terminal that is the communication partner with the session from the plurality of terminals in the storage device, and may specify that a communication source terminal among terminals between which communication is performed is the intersection terminal as one indicating the condition defined in the policy and the predetermined degree of conformity among the communication histories indicated by the communication relation information.

Further, in the abnormality cause specification support method of the present embodiment, the information processing system may further hold the distance information between the intersection terminals in the storage device, and may specify that the communication source terminal among the terminals between which the communication performed is the intersection terminal, specify another intersection terminal within a predetermined distance range from the specified intersection terminal based on the distance information, and further specify a route between the specified intersection terminal and the other intersection terminal as the abnormality cause route as one indicating the condition defined in the policy and the predetermined degree of conformity among the communication histories indicated by the communication relation information.

Further, in the abnormality cause specification support method of the present embodiment, the information processing system may specify that the communication is communication without the session as one indicating the condition defined in the policy and the predetermined degree of conformity among the communication histories indicated by the communication relation information.

Further, in the abnormality cause specification support method of the present embodiment, the information processing system may specify that the communication between terminals is communication with the session as one indicating the condition defined in the policy and the predetermined degree of conformity among the communication histories indicated by the communication relation information That is, in the abnormality cause specification support method of the present embodiment, the information processing system may further hold information on acquisition time of the communication history in the storage device, and further execute a process of deleting, from the communication histories indicated by the communication relation information, a communication history that passes predetermined time from the acquisition time based on the information on the acquisition time.

REFERENCE SIGN LIST

10: network
20: terminal
101: abnormality cause specification support system
102: detection function
103: communication relation information creating and updating information
104: intersection terminal information creating and updating function
105: abnormality cause route specification prioritizing function
106: terminal information management storage unit
107: communication relation information management storage unit
108: intersection terminal information management storage unit
109: abnormal cause route specification prioritizing policy storage unit
201: CPU (arithmetic device)
202: memory
203: storage device
204: input device
205: output device
206: communication control device
210: program
301: terminal information
401: communication relation information
501: intersection terminal information
601: abnormal cause route specification prioritizing policy

The invention claimed is:
1. An abnormality cause specification support system comprising:
a storage device configured to store communication relation information in a database table, in which a communication history between terminals belonging to a predetermined network is stored separately in different columns of the database table, according to whether each of the terminals establishes a session in communication with a first terminal, and policy for specifying a cause route of an abnormality occurring in the network, wherein a first column of the database table stores terminal identifiers of terminals that have established a session in communication with the first terminal and a second column of the database table stores terminal identifiers of terminals that have not established a session in communication with the first terminal; and a processor configured to specify, among communication histories indicated by the communication relation information, a communication history indicating a predetermined degree of conformity with a condition defined in the policy, and specify, as a priority in the network, a route between the terminals, indicated by the specified communication history, as an abnormality cause route.

2. The abnormality cause specification support system according to claim 1, wherein the storage device is configured to further store information about an intersection terminal that is a partner of communication during a session between the terminals, and wherein the processor is further configured to specify as the communication history indicating the predetermined degree of the conformity with the condition defined in the policy as a communication history that includes the intersection terminal.

3. The abnormality cause specification support system according to claim 2, wherein the storage device is configured to further store distance information that is related to the distance between the intersection terminals, and wherein the processor is further configured to specify a second intersection terminal within a predetermined distance range from the intersection terminal based on the distance information, and further specify that the abnormality cause route is a route between the specified intersection terminal and the second intersection terminal.

4. The abnormality cause specification support system according to claim 1, wherein the communication history indicating the predetermined degree of conformity with the condition defined in the policy is a communication history of a terminal that has not established a session in communication with the first terminal.

5. The abnormality cause specification support system according to claim 1, wherein the communication history indicating the predetermined degree of conformity with the condition defined in the policy is a communication history of a terminal that has established a session in communication with the first terminal.

6. The abnormality cause specification support system according to claim 1, wherein the storage device is further configured to store an acquisition time of the communication history, and wherein the processor is further configured to delete, from the communication histories indicated by the communication relation information, a communication history for which a predetermined time has elapsed from the acquisition time.

7. An abnormality cause specification support method, comprising:

storing, in a database table of a storage device in an information processing system, communication relation information in which a communication history between terminals belonging to a predetermined network is stored separately in different columns of the database table, according to whether each of the terminals establishes a session in communication with a first terminal, and a policy for specifying a cause route of an abnormality occurring in the network, wherein a first column of the database table stores terminal identifiers of terminals that have established a session in communication with the first terminal and a second column of the database table stores terminal identifiers of terminals that have not established a session in communication with the first terminal;

specifying, among communication histories indicated by the communication relation information, a communication history indicating a predetermined degree of conformity with a condition defined in the policy; and specifying, as a priority in the network, a route between the terminals, indicated by the specified communication history, as an abnormality cause route.

8. The abnormality cause specification support method according to claim 7, wherein the information processing system is further configured to:

store, in the storage device, information about an intersection terminal that is a partner of communication during a session between the terminals, and specify the communication history indicating the predetermined degree of conformity with the condition defined in the policy as a communication history that includes the intersection terminal.

9. The abnormality cause specification support method according to claim 8, wherein the information processing system is further configured to:

store, in the storage device, distance information that is related to the distance between the terminals, and specify a second intersection terminal within a predetermined distance range from the intersection terminal based on the distance information, and further specify that the abnormality cause route is a route between the intersection terminal and the second intersection terminal.

10. The abnormality cause specification support method according to claim 7, wherein the the communication history indicating the predetermined degree of conformity with the condition defined in the policy is a communication history of a terminal that has not established a session in communication with the first terminal.

11. The abnormality cause specification support method according to claim 7, wherein the communication history indicating the predetermined degree of conformity with the condition defined in the policy is a communication history of a terminal that has established a session in communication with the first terminal.

12. The abnormality cause specification support method according to claim 7, wherein the information processing system is further configured to:

store, in the storage device, an acquisition time of the communication history, and delete, from the communication histories indicated by the communication relation information, a communication history for which a predetermined time has elapsed from the acquisition time.

* * * * *